UNITED STATES PATENT OFFICE 2,580,459

PRODUCTION OF HALOGENATED ARYL FATTY ACIDS

Domenick Papa, Brooklyn, N. Y., and Erwin Schwenk, Montclair, N. J., assignors to Schering Corporation, Bloomfield, N. J., a corporation of New Jersey No Drawing. Application November 27, 1946, Serial No. 712,728

8 Claims. (Cl. 260—473)

The present invention relates to a method of producing iodinated and brominated aryl aliphatic carboxylic acids and their salts and esters and to certain new iodinated aryl fatty acid compounds thereby obtained.

It is an object of the present invention to provide a method for the manufacture of iodinated and brominated aryl fatty acid compounds whereby iodine or bromine is smoothly introduced into the aromatic ring with a minimum of side reactions. A further object of the invention is the provision of a method for iodination or bromination of aryl fatty acid compounds substantially solely in the aromatic ring. Still another object of the invention is the provision of a group of compounds useful as radiographic contrast agents.

The method of the invention is characterized by the treatment of an aryl fatty acid compound, including the free acids, their salts and their esters, having at least one alkyl ether or at least two alkyl groups attached to the aromatic ring, with iodine or bromine in the presence of a silver salt of a carboxylic acid, which may be either the carboxylic acid to be halogenated or another carboxylic acid such as acetic acid.

The aryl fatty acid compounds which are adapted to be halogenated by the method of the invention may be represented by the general formula

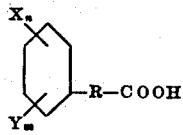

wherein X represents a lower alkyl ether group, Y represents a lower alkyl group, n and m or 0, 1 or 2 and n+(m—1) is at least equal to 1, and R is a bivalent aliphatic group containing up to seventeen carbon atoms.

In general, the iodination of these aryl fatty acid compounds is advantageously carried out in the presence of a solvent for iodine, such as carbon tetrachloride or acetic acid. The iodine may be added, either in solution or in dry finely powdered form to a solution or suspension of the silver salt of the acid to be iodinated in an anhydrous liquid medium, or to a solution or suspension of the acid or a salt or ester thereof, together with a mol of a silver salt of another carboxylic acid such as silver acetate for each iodine atom to be introduced.

The following examples are illustrative of the principles of the invention:

EXAMPLE 1

β-(2-iodo-5-methoxyphenyl)-propionic acid 25.4 gm. of iodine dissolved in 500–750 cc. of anhydrous carbon tetrachloride is added dropwise with stirring to 0.1 mol of dry silver β-(m-methoxylphenyl)-propionate suspended in anhydrous carbon tetrachloride. The reaction proceeds rapidly at room temperature. After the addition of iodine is completed, the silver halide is filtered off, the carbon tetrachloride evaporated, and the residue recrystallized from aqueous alcohol. The iodinated acid melts at 109–110° C.

Alternatively, 25.4 gm. of finely powdered iodine may be added in small portions with stirring to 0.1 mol of the dry silver salt in 250 cc. of anhydrous carbon tetrachloride. After the addition of iodine is completed, the mixture is worked up as in the preceding method.

EXAMPLE 2

β-(2-brom-5-methoxyphenyl)-propionic acid

To 0.1 mol of anhydrous silver β-(m-methoxyphenyl)-propionate in 250 cc. of phosphorous pentoxide dried carbon tetrachloride, there is added dropwise with stirring 0.1 mol of bromine dissolved in 50 cc. carbon tetrachloride. The reaction proceeds rapidly without the development of heat and after the addition is completed, the silver halide is filtered off, the carbon tetrachloride evaporated and the residue recrystallized from aqueous alcohol. The β-(2-brom-5-methoxyphenyl)-propionic acid is obtained in good yield and melts at 83–84° C.

EXAMPLE 3

Ethyl γ-(3-iodo-4-methoxyphenyl)-butyrate

γ-(p-Methoxyphenyl)-butyric acid may be prepared in the known manner from anisol and succinic anhydride by means of the Friedel-Crafts reaction, followed by reduction of the benzoyl derivative. The iodination of the substituted butyric acid is carried out substantially as described in Example 1. Recrystallization from a mixture of alcohol and water gives the γ-(3-iodo-4-methoxyphenyl)-butyric acid melting at 106.5–107.5° C.

Fifty grams of γ-(3-iodo-4-methoxyphenyl)-butyric acid are suspended in 200 cc. of absolute ethyl alcohol, and after the addition of approximately 5 cc. of acetyl chloride it is allowed to stand for a few days. The alcoholic solution is then poured into water, extracted with ether, and the alcohol washed out of the ether layer. On drying and evaporating off the ether, the ethyl γ-(3-iodo-4-methoxyphenyl)-butyrate distills over at 174–175° C./1 mm.

EXAMPLE 4

*Ethyl 3-iodo-4-methoxyphenyl-acetate*

This compound is prepared in the manner described for the butyric acid derivative of Example 3. The 3-iodo-4-methoxyphenyl acetic acid, after recrystallization from alcohol and water, melts at 127–128° C. Esterification with absolute alcohol and acetyl chloride gives the ethyl ester boiling at 132–135° C./1 mm.

EXAMPLE 5

*β - Methyl - β - (3 - iodo - 4 - methoxyphenyl) - propionic acid*

The intermediate, β - methyl - β - (4-methoxyphenyl)-propionic acid, may be prepared from p-methoxyacetophenone and ethylbromacetate via the Reformatsky reaction as described in our copending application Serial No. 557,934, filed October 9, 1944, now abandoned. Iodination in accordance with Example 1 yields the iodo derivative which melts at 99.5–100.5° C. on recrystallization from dilute alcohol.

EXAMPLE 6

*Ethyl δ-(3-iodo-4-methoxyphenyl)-valerate*

The intermediate, δ-(4-methoxyphenyl)-valeric acid, is prepared from anisol and glutaric anhydride via the Friedel-Crafts reaction, followed by Clemmensen reduction of the benzoyl derivative.

An alternate method for obtaining this compound is to condense via the Friedel-Crafts reaction, γ-carboethoxybutyryl chloride with anisol in the presence of acetylene tetrachloride. The product obtained from this Friedel-Crafts reaction on reduction with zinc and HCl gives the δ-(4-methoxyphenyl)-valeric acid melting at 110–111° C. after recrystallization from dilute alcohol.

Iodination of this valeric acid with silver acetate as described in Example 1 yields the 3-iodo derivative melting at 142–144°, after recrystallization from dilute alcohol. Esterification with absolute ethyl alcohol and acetyl chloride yields the ethyl δ-(3-iodo-4-methoxyphenyl)-valerate boiling at 185° C./3 mm.

EXAMPLE 7

*Ethyl ω-(2,5-dimethyl-4-iodophenyl)-caprate*

0.1 mol of ethyl ω-(2,5-dimethylphenyl)-caprate, obtained from p-xylene and ω-carboethoxypelargonyl chloride followed by Clemmensen reduction essentially as described in Example 6, is dissolved in 250 cc. of acetic acid. With stirring 0.1 mol of iodine and 0.11 mol of silver acetate is alternately added in small portions. After the addition is completed, the reaction mixture is stirred for a short time at room temperature, the silver halide filtered off and acetic acid filtrate diluted with water. The iodinated oil is extracted from the aqueous acetic acid with ether, the ether extracts washed with water, dried and evaporated. The residue is fractionally distilled and yields the iodo compound boiling at approximately 210–215° C./1 mm.; $n_D^{24}$=1.5292.

EXAMPLE 8

*Ethyl ω-(3-iodo-4-methoxyphenyl)-caproate*

The intermediate required for this iodo ester may be prepared from δ-carboethoxyvaleryl chloride and anisol in accordance with the Friedel-Crafts reaction. Reduction of the benzoyl derivative with zinc and HCl gives the ω-(p-methoxyphenyl)-caproic acid.

Iodination of this caproic acid with silver acetate and iodine yields the 3-iodo derivative which melts at 85–86° C. after recrystallization from dilute alcohol.

The ω-(3-iodophenyl)-caproic acid may be esterified, as previously described. The ethyl ester after isolation is distilled and boils at 190–192° C./1 mm.

EXAMPLE 9

*Ethyl ω-(3-iodo-4-methoxyphenyl)-caprate*

The intermediate, ω-(p-methoxyphenyl)-capric acid, is obtained by the Friedel-Crafts condensation of anisol and ω-carboethoxypelargonyl chloride in the presence of acetylene tetrachloride, followed by Clemmensen reduction of the benzoyl derivative, as described in our copending application Serial No. 557,934. Twenty-two grams of ethyl ω-(4-methoxyphenyl)-caprate, obtained by esterification of the free acid, are dissolved in 200 cc. of glacial acetic acid, and then treated gradually over a period of a few hours with silver acetate and iodine as described in Example 7. The solution is poured into water and extracted with ether. The ether layer is washed with sodium bisulfite, water, dried, and re-esterified overnight with absolute alcohol and acetyl chloride. The iodo ester is isolated in the usual manner and distills at 206–210° C./1–2 mm.

EXAMPLE 10

*Ethyl γ-(3,4-dimethoxy-6-iodophenyl)-butyrate*

To 0.1 m. of γ-(3,4-dimethoxyphenyl)-butyric acid dissolved in 100 c. of glacial acetic acid, there is added the requisite amount of iodine and silver acetate as in Example 7. The iodo acid so obtained melts at 168° C. Esterification with ethyl alcohol, as previously described, yields the ester which melts at 51° C.

EXAMPLE 11

*Ethyl γ-(2-methyl-4-methoxy-5-iodophenyl)-butyrate*

γ-(2-methyl-4-methoxyphenyl)-butyric acid is iodinated in accordance with the method described in Example 1. The iodo acid is obtained in the form of white needles from alcohol and water. When esterified in the manner described in the previous examples, it distills at 160–164° C./1 mm.

EXAMPLE 12

*Ethyl γ-(3-iodo-4-ethoxyphenyl)-butyrate*

The intermediate, β-(p-ethoxybenzoyl)-propionic acid, may be prepared by the Friedel-Crafts synthesis with phenetol and succinic anhydride. On reduction of the keto group by the known Clemmensen method, there is obtained the γ-(p-ethoxyphenyl)-butyric acid melting at 64.5–65° C. Iodination of either the free acid or the ester by the methods described in the previous examples gives the γ-(3-iodo-4-ethoxyphenyl)-butyric acid melting at 74–75.5° C., or the ethyl γ-(3-iodo-4-methoxyphenyl)-butyrate boiling at 179–184° C./3 mm. The latter compound is obtained as a free-flowing, pale yellow liquid.

EXAMPLE 13

*Ethyl ω-(3-iodo-4-methoxyphenyl)-undecylate*

In accordance with the procedure described by Forneau and Baranger (Bull. soc. chim. [4], 49, 1161-72 (1931)), ethyl undecylenate and anisol can be reacted in the presence of aluminum chloride, with petroleum ether as solvent, to yield ethyl ω-(p-methoxyphenyl)-undecylate, together with ethyl 9-(p-methoxyphenyl)-undecylate. This mixture boils at 175–180° C./1 mm., and is obtained in a yield of 60–70%. Iodination of this ester mixture with silver acetate and iodine gives the 3-iodo derivative in good yields boiling at 212–215° C./1 mm. The compound is a very pale yellow liquid.

EXAMPLE 14

*Ethyl ω-(3-iodo-4-ethoxyphenyl)-undecylate*

By proceeding in accordance with the directions of Example 13 and substituting phenetol for anisol, the ethoxy homologue can be obtained. The substance is a free-flowing liquid which distills over at a temperature of approximately 215–220° C./1 mm.

EXAMPLE 15

*Ethyl ω-(2-methyl-4-methoxy-5-iodophenyl)-undecylate*

The intermediate, ethyl ω-(2-methyl-4-methoxyphenyl)-undecylate, may be prepared from m-cresyl methyl ether and ethyl undecylenate in accordance with the previously described procedures. It is obtained as a pale yellow oil boiling at 165–168° C./1 mm., $n^{24}=1.4914$.

To 33.4 g. of the above ester in 250 cc. of acetic acid there is added alternately in small portions 25.4 g. of finely powdered iodine and 17 g. of silver acetate. After the reaction is completed the iodinated ester is isolated in the usual manner. It distills under a pressure of 1 mm. at approximately 210–215° C.

Ethyl ω-(p-methoxyphenyl)-stearate, a pale yellow free-flowing liquid boiling at about 230° C./1 mm., obtained by the method referred to in Example 13, may be iodinated to the 3-iodo derivative by the method of the invention. The 3-iodo compound is a nearly colorless liquid boiling at about 270° C./1-2 mm.

Alkoxyphenyl substituted branched chain aliphatic acids which may be iodinated by the method of the invention are conveniently prepared by condensing an alkoxybenzaldehyde with an aliphatic acid in the presence of the corresponding anhydride and reducing the resulting unsaturated acid. For example, the condensation of p-methoxybenzaldehyde with R.COONa in the presence of (RCO)₂O, wherein R represents an alkyl group results in acids of the formula

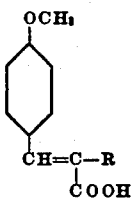

which may be reduced and iodinated by the method of the invention.

The iodinated aryl fatty acid compounds of the present invention are excellent X-ray contrast agents. The esters of the iodoalkoxyphenyl fatty acids are particularly valuable for use in the radiographic examination of the spinal cavity, because of their low toxicity. Of particular utility are the lower alkyl esters of 3-iodo-4-methoxy or ethoxyphenyl substituted fatty acids containing from 4 to 12 carbon atoms in the aliphatic chain, such as—

Ethyl ω-(3-iodo-4-ethoxyphenyl)-caprate
Ethyl δ-(3-iodo-4-methoxyphenyl)-valerate
Ethyl ω-(3-iodo-4-methoxyphenyl)-caproate
Ethyl ω-(3-iodo-4-methoxyphenyl)-caprate
Ethyl ω-(2-methyl-4-methoxy-5-iodophenyl)-undecylate For example, extensive pharmacological tests have shown that the ethyl ω-(3-iodo-4-methoxyphenyl)-undecylate of Example 13 has a 50% lethal dosage which is over four times as large as that of a myelographic agent commonly used at the present time, while the X-ray images obtained with the same amounts of the two agents are equally clear and sharp. When the two substances are injected intrathecally with amounts of the substances adequate to give good X-ray images, the experimental animals injected with the ethyl ω-(3-iodo-4-methoxyphenyl)-undecylate are free from the lameness and loss of control of the hind limbs which characterized animals injected with the same amount of the commonly used agent. These observations are confirmed by the absence of pathological lesions found in histological study of the spinal cords of animals injected with the substance of the invention, whereas the spinal cords of animals injected with the commonly used agent showed extensive intradural inflammation adequate to cause lameness and partial paralysis.

We claim:

1. A method of halogenating phenyl fatty acids which comprises treating a phenyl saturated aliphatic carboxylic acid compound selected from the group consisting of acids of the general formula

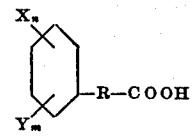

wherein X represents a lower alkyl ether group, Y represents a lower alkyl group, n and m are integers selected from 0, 1 and 2, m being 2 when n is 0, and R is a bivalent saturated aliphatic group containing up to seventeen carbon atoms, and the salts and esters of said acids, with a halogen selected from the group consisting of bromine and iodine in the presence of a silver salt of a carboxylic acid.

2. A method of halogenating phenyl fatty acids which comprises treating a silver salt of a phenyl saturated aliphatic carboxylic acid of the general formula

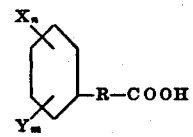

wherein X represents a lower alkyl ether group, Y represents a lower alkyl group, n and m are integers selected from 0, 1 and 2, m being 2 when n is 0, and R is a bivalent saturated aliphatic group containing up to seventeen carbon atoms, with a halogen selected from the group consisting of bromine and iodine.

3. A method of halogenating phenyl fatty acids which comprises treating a phenyl saturated aliphatic carboxylic acid of the general formula

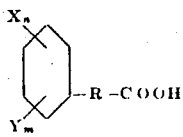

wherein X represents a lower alkyl ether group, Y represents a lower alkyl group, $n$ and $m$ are integers selected from 0, 1 and 2, $m$ being 2 when $n$ is 0, and R is a bivalent saturated aliphatic group containing up to seventeen carbon atoms, with a halogen selected from the group consisting of bromine and iodine in the presence of silver acetate.

4. The method of making iodophenyl fatty acid compounds which comprises treating a phenyl saturated aliphatic carboxylic acid compound containing up to seventeen carbon atoms in the aliphatic chain exclusive of the carboxyl group, having an alkyl ether group attached to the phenyl group, with iodine in the presence of a silver salt of a carboxylic acid.

5. The method of making iodophenyl fatty acid compounds which comprises treating a phenyl saturated aliphatic carboxylic acid compound containing up to seventeen carbon atoms in the aliphatic chain exclusive of the carboxyl group, having two lower alkyl groups attached to the phenyl group, with iodine in the presence of a silver salt of a carboxylic acid.

6. An X-ray contrast agent prepared for injection comprising as the principal operative component an ethyl ester of a 3-iodo-4-methoxyphenyl saturated aliphatic carboxylic acid in which the aliphatic group contains from 9 to 12 carbon atoms.

7. An X-ray contrast agent comprising as the principal operative component ethyl ω-(3-iodo-4-methoxyphenyl)-caprate.

8. An X-ray contrast agent comprising as the principal operative component ethyl ω-(3-iodo-4-methoxyphenyl)-undecylate.

DOMENICK PAPA.
ERWIN SCHWENK.

REFERENCES CITED

The following references are of record in the file of this patent:

UNITED STATES PATENTS

| Number | Name | Date |
|---|---|---|
| 2,345,384 | Dohrn | Mar. 28, 1944 |
| 2,348,231 | Strain et al. | May 9, 1944 |
| 2,400,433 | Natelson | May 14, 1946 |

FOREIGN PATENTS

| Number | Country | Date |
|---|---|---|
| 517,382 | Great Britain | July 25, 1939 |

OTHER REFERENCES

Simonini: Monatshefte für Chemie, vol. 14, p. 87 (1893).

Houben: "Die Methoden der Organischen Chemie," Edwards Bros., Inc., Ann Arbor, Mich.; 1943 (lithoprint), 3rd ed., vol. 3, pp. 1168 and 1171.

Baker et al.: "Journ. Soc. Chem. Ind.," vol. 63, pp. 223–224 (1944).